US012084181B2

(12) United States Patent
Chilson et al.

(10) Patent No.: US 12,084,181 B2
(45) Date of Patent: Sep. 10, 2024

(54) UNMANNED AERIAL SYSTEM FOR SAMPLING ATMOSPHERIC DATA

(71) Applicant: The Board of Regents of the University of Oklahoma, Oklahoma City, OK (US)

(72) Inventors: Phillip B. Chilson, Norman, OK (US); Antonio R. Segales Espinosa, Norman, OK (US); William J. Doyle, Norman, OK (US); Tyler M. Bell, Norman, OK (US); Brian R. Murillo Greene, Norman, OK (US); Joshua J. Martin, Norman, OK (US); Elizabeth A. Pillar-Little, Norman, OK (US); Gustavo Britto Hupsel de Azevedo, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 460 days.

(21) Appl. No.: 17/146,352

(22) Filed: Jan. 11, 2021

(65) Prior Publication Data
US 2021/0214079 A1    Jul. 15, 2021

Related U.S. Application Data

(60) Provisional application No. 62/959,806, filed on Jan. 10, 2020.

(51) Int. Cl.
*B64C 39/02* (2023.01)
*B64U 10/13* (2023.01)
(Continued)

(52) U.S. Cl.
CPC ............ *B64C 39/024* (2013.01); *B64U 10/13* (2023.01); *B64U 30/20* (2023.01); *B64U 2101/35* (2023.01); *B64U 2201/10* (2023.01)

(58) Field of Classification Search
CPC ... B64D 43/02; B64C 2201/125; G01W 1/08; B64U 2101/35
See application file for complete search history.

(56) References Cited

U.S. PATENT DOCUMENTS

| 2,246,555 A * | 6/1941 | Underwood | B64D 43/02 340/979 |
| 6,419,186 B1 * | 7/2002 | Bachinski | G01P 13/025 73/182 |

(Continued)

FOREIGN PATENT DOCUMENTS

KR    20180031298 A  *  3/2018

OTHER PUBLICATIONS

Bell, T. M., Greene, B. R., Klein, P. M., Carney, M., and Chilson, P. B. (2019). Confronting the Boundary Layer Data Gap: Evaluating New and Existing Methodologies of Probing the Lower Atmosphere. Atmos. Meas. Tech., 13, 3855-3872.

(Continued)

*Primary Examiner* — Christopher D Hutchens
(74) *Attorney, Agent, or Firm* — Crowe & Dunlevy, P.C.

(57) ABSTRACT

An unmanned aerial system (UAS) adapted to measure one or more atmospheric conditions has a frame and a plurality of motorized rotors suspended on arms extending outward from the frame. The UAS further includes a flight control module that includes a computer programmable flight control board and a sensor package that has an air sampling scoop, a first sensor positioned inside the air sampling scoop, and a ducted fan inside the air sampling scoop. The ducted fan is configured to draw air through the air sampling scoop in contact with the first sensor. The ducted fan can be (Continued)

configured to operate only when the UAS is above a predetermined altitude. The UAS may also be configured to operate in a "wind vane" mode in which wind speed and direction is determined based on the pitch and heading of the UAS.

10 Claims, 6 Drawing Sheets
(2 of 6 Drawing Sheet(s) Filed in Color)

(51) Int. Cl.
*B64U 30/20* (2023.01)
*B64U 101/35* (2023.01)

(56) References Cited

U.S. PATENT DOCUMENTS

| | | | | |
|---|---|---|---|---|
| 2007/0221790 | A1* | 9/2007 | Goossen | G01P 5/14 244/53 B |
| 2012/0232721 | A1* | 9/2012 | Engblom | G05D 1/105 701/3 |
| 2017/0283038 | A1* | 10/2017 | Lin | B64C 39/024 |
| 2017/0284296 | A1* | 10/2017 | Nestico | F02C 7/057 |
| 2018/0086437 | A1* | 3/2018 | Pastouchenko | B64C 21/01 |
| 2018/0259429 | A1* | 9/2018 | Adams | B64C 39/024 |
| 2019/0187168 | A1* | 6/2019 | Mukai | G01P 13/045 |
| 2019/0219488 | A1* | 7/2019 | McNamara | G01N 1/24 |
| 2020/0033157 | A1* | 1/2020 | Kaufman | B64D 1/02 |
| 2021/0380272 | A1* | 12/2021 | Parrott | B64D 43/00 |
| 2022/0221398 | A1* | 7/2022 | Aker | G05D 1/0044 |
| 2022/0276070 | A1* | 9/2022 | Kirksey | G08G 5/0052 |

OTHER PUBLICATIONS

Bonin, T. A., Goines, D., Scott, A., Wainwright, C., Chilson, P. B., and Gibbs, J.: Measurements of the Temperature Structure-Function Parameters with a Small Unmanned Aerial System Compared with a Sodar, Boundary-Layer Meteorology, 155(3), 417-434, 2015.
Bonin, T., Zielke, B., Bocangel, W., Shalamunenc, W., and Chilson, P. (2011). An analysis of wind retrieval algorithms for small unmanned aerial systems. In Proc 91st AMS Ann. Conf. Amer. Meteorol. Soc.
Brock, F. V., Crawford, K. C., Elliott, R. L., Cuperus, G. W., Stadler, S. J., Johnson, H. L., and Eilts, M. D. (1995). Oklahoma Mesonet: A technical overview. J. Atmos. Ocean. Tech., 12:5-19.
Brosy, C., Krampf, K., Zeeman, M., Wolf, B., Junkermann, W., Schäfer, K., Emeis, S., and Kunstmann, H. (2017). Simultaneous multicopter-based air sampling and sensing of meteorological variables. Atmos. Meas. Tech., 10:2773-2784.
Chilson, P. B., Bell, T. M., Brewster, K. A., de Azevedo, G. B., Carr, F. H., Carson, K., Fiebrich, C. A., Greene, B. R., Grimsley, J. L., Kanneganti, S. T., Martin, J., Moore, A., Palmer, R. D., Pillar-Little, E. A., Salazar-Cerreno, J., Segales, A. R., Weber, M., Yeary, M., and Droegemeier, K. K. (2019). Moving towards a network of autonomous UAS atmospheric profiling stations for observations in the Earth's lower atmosphere: The 3D Mesonet concept. Sensors, 19(12):2720.
Elston, J., Argrow, B., Stachura, M., Weibel, D., Lawrence, D., and Pope, D. (2015). Overview of small fixed-wing unmanned aircraft for meteorological sampling. J. Atmos. Ocean. Tech., 32:97-115.
Greene, B. R., Segales, A. R., Bell, T. M., Pillar-Little, E. A., and Chilson, P. B. (2019). Environmental and sensor integration influences on temperature measurements by rotary-wing unmanned aircraft systems. Sensors, 19(6):1490.
Greene, B. R., Segales, A. R., Waugh, S., Duthoit, S., and Chilson, P. B. (2018). Considerations for temperature sensor placement on rotary-wing unmanned aircraft systems. Atmos. Meas. Tech., 11(10):5519-5530.
Greene, B. R.: Boundary Layer Profiling Using Rotary-Wing Unmanned Aircraft Systems: Filling the Atmospheric Data Gap, Master's thesis, The University of Oklahoma, https://hdl.handle.net/11244/301374, 2018.
Hardesty, R. M. and Hoff, R. M. (2012). Thermodynamic profiling technologies workshop report to the national science foundation and the national weather service. Technical Report NCAR/TN-488+STR, National Center for Atmospheric Research.
Hemingway, B. L., Frazier, A. E., Elbing, B. R., and Jacob, J. D. (2017). Vertical sampling scales for the atmospheric boundary layer measurements from small unmanned aircraft systems (sUAS). Atmosphere, 8(176).
Hunter, J. D.: Matplotlib: A 2D graphics environment, Computing in Science & Engineering, 9, 90-95, https://doi.org/10.1109/MCSE.2007.55, 2007.
Koch, S. E., Fengler, M., Chilson, P. B., Elmore, K. L., Argrow, B., Andra, Jr., D. L., and Lindley, T.: On the Use of Unmanned Aircraft for Sampling Mesoscale Phenomena in the Preconvective Boundary Layer, 35, 2265-2288, 2018.
Konrad, T. G., Hill, M. L., Meyer, J. H., and Rowland, J. R.: A small, radio-controlled aircraft as a platform for meteorological sensors, Applied Physics Lab Technical Digest, 10, 11-19, 1970.
Kral, S., Reuder, J., Vihma, T., Suomi, I., O'Connor, E., Kouznetsov, R., Wrenger, B., Rautenberg, A., Urbancic, G., Jonassen, M., Båserud, L., Maronga, B., Mayer, S., Lorenz, T., Holtslag, A., Steeneveld, G.-J., Seidl, A., Müller, M., Lindenberg, C., Langohr, C., Voss, H., Bange, J., Hundhausen, M., Hilsheimer, P., and Schygulla, M.: Innovative Strategies for Observations in the Arctic Atmospheric Boundary Layer (ISOBAR)—The Halluoto 2017 Campaign, Atmosphere, 9, 268, 2018.
Lee, T. R., Buban, M., Dumas, E., and Baker, C. B. (2017). A new technique to estimate sensible heat fluxes around micrometeorological towers using small unmanned aircraft systems. J. Atmos. Ocean. Tech., 34:2103-2112.
Martin, S., Bange, J., and Beyrich, F. (2011). Meteorological profiling of the lower troposphere using the research UAV "M2AV Carolo". Atmos. Meas. Tech., 4, 705-716, 2011.
McPherson, R. A., Fiebrich, C. A., Crawford, K. C., Kilby, J. R., Grimsley, D. L., Martinez, J. E., Basara, J. B., Illston, B. G., Morris, D. A., Kloesel, K. A., Melvin, A. D., Shrivastava, H., Wolfinbarger, J. M., Bostic, J. P., Demko, D. B., Elliott, R. L., Stadler, S. J., Carlson, J., and Sutherland, A. J. (2007). Statewide monitoring of the mesoscale environment: A technical update on the Oklahoma Mesonet. J. Atmos. Ocean. Tech., 24:301-321.
Meteomatics. Meteodrone (http://www.meteomatics.com/en/meteodrones-technology/).
National Research Council, Washington, D. (2009). Observing Weather and Climate from the Ground Up: A Nationwide Network of Networks. National Academy Press.
Neumann, P. P. and Bartholmai, M. (2015). Real-time wind estimation on a micro unmanned aerial vehicle using its inertial measurement unit. Sensors Actuators A: Physical, 235:300-310.
Palomaki, R. T., Rose, N. T., van den Bossche, M., Sherman, T. J., and De Wekker, S. F.: Wind estimation in the lower atmosphere using multirotor aircraft, Journal of Atmospheric and Oceanic Technology, 34, 1183-1191, 2017.
PrecisionHawk. https://www.precisionhawk.com.
Reuder, J., Brisset, P., Jonassen, M., Müller, M., and Mayer, S.: The Small Unmanned Meteorological Observer Sumo: A new tool for atmospheric boundary layer research, Meteorologische Zeitschrift, 18, 141-147, 2009.
Segales, A. R., Greene, B. R., Bell, T. M., Doyle, W., Martin, J. J., Pillar-Little, E. A., and Chilson, P. B. The CopterSonde: an insight into the development of a smart unmanned aircraft system for atmospheric boundary layer research, Atmos. Meas. Tech. 13, 2833-2848, 2020.
Turner, D. D. and Blumberg. W. G.: Improvements to the AERIoe Thermodynamic Profile Retrieval Algorithm, IEEE Journal of Selected Topics in Applied Earth Observations and Remote Sensing, 12(5), 1-16, 2018.
Van der Walt, S., Colbert, S. C., and Varoquaux, G.: The NumPy Array: A Structure for Efficient Numerical Computation, Computing in Science Engineering, 13, 22-30, 2011.

(56) References Cited

OTHER PUBLICATIONS

Wagner, T. J., Klein, P. M., and Turner, D. D.: A New Generation of Ground-Based Mobile Platforms for Active and Passive Profiling of the Boundary Layer, Bulletin of the American Meteorological Society, 100, 137-153, 2019.

Wainwright, C. E., Bonin, T. A., Chilson, P. B., Gibbs, J. A., Fedorovich, E., and Palmer, R. D.: Methods for Evaluating the Temperature Structure-Function Parameter Using Unmanned Aerial Systems and Large-Eddy Simulation, Boundary-Layer Meteorology, 155, 189-208, 2015.

Wessel, P., Smith, W. H. F., Scharroo, R., Luis, J., and Wobbe, F.: Generic Mapping Tools: Improved Version Released, Eos, Transactions American Geophysical Union, 94, 409-410, 2013.

Wildmann, N., Hofsäß, M., Weimer, F., Joos, A., and Bange, J. (2014). MASC—a small Remotely Piloted Aircraft (RPA) for wind energy research. Adv. Sci. Res., 11:55-61.

Lindsay Barbieri, et al.; Intercomparison of Small Unmanned Aircraft System (sUAS) Measurements for Atmospheric Science during the LAPSE-RATE Campaign; Sensors 2019, 19, 2179; Published: May 10, 2019; www.mdpi.com/1424-8220/19/9/2179.

Gijs De Boer, et al.; Development of Community, Capabilities, and Understanding through Unmanned Aircraft-Based Atmospheric Research: The Lapse-Rate Campaign; American Meteorological Society; E684-E699; May 1, 2020; https://doi.org/10.1175/BAMS-D-19-0050.1.

Pauli Virtanen, et al.; SciPy 1.0—Fundamental Algorithms for Scientific Computing in Python; arXiv e-prints; https://arxiv.org/pdf/1907.10121.

* cited by examiner

US 12,084,181 B2

UNMANNED AERIAL SYSTEM FOR SAMPLING ATMOSPHERIC DATA

RELATED APPLICATIONS

This application claims the benefit of U.S. Provisional Patent Application Ser. No. 62/959,806 filed Jan. 10, 2020 and entitled "Unmanned Aerial System for Sampling Atmospheric Data," the disclosure of which is incorporated by reference as if fully set forth herein in its entirety.

GOVERNMENT SUPPORT

This invention was made with government support under Grant Number 1539070 awarded by the National Science Foundation. The government has certain rights in the invention.

BACKGROUND

The atmospheric boundary layer (ABL) is a dynamic system that experiences significant changes in the thermodynamic and kinematic states in its vertical and horizontal structures. An understanding of these structures is important for improving numerical modeling, simulations, and weather forecasts. A combination of fine-scale domain models along with higher resolution observations in space and time are required to advance such understanding. The measurement of temperature, humidity, pressure and winds are some of the most important parameters for the description of the thermodynamic and kinematic behavior of the atmospheric boundary layer. There are currently several meteorological instruments able to measure these parameters effectively; however, they are limited in coverage and have high operating costs. This has resulted in a "data gap" in the atmospheric boundary layer.

Unmanned aircraft systems (UAS) are an emerging technology with a growing interest for weather research and atmospheric monitoring in the scientific community. The advancements in unmanned aircraft systems have led to a rapid growth in autopilot capabilities, ground station software, and airframes. Despite these advancements, existing unmanned aircraft systems configured for weather observation suffer from several deficiencies. In particular, current unmanned aircraft systems are expensive, subject to restrictive operational limits and require significant operator oversight. These deficiencies frustrate the widespread distribution of aerial weather observations systems capable of accurately measuring characteristics at the atmospheric boundary layer. It is to these and other deficiencies in the prior art that embodiments of the present invention are directed.

BRIEF DESCRIPTION OF THE DRAWINGS

Several embodiments of the present disclosure are hereby illustrated in the appended drawings. It is to be noted however, that the appended drawings only illustrate several typical embodiments and are therefore not intended to be considered limiting of the scope of the inventive concepts disclosed herein. The figures are not necessarily to scale and certain features and certain views of the figures may be shown as exaggerated in scale or in schematic in the interest of clarity and conciseness. The patent or application file contains at least one drawing executed in color. Copies of this patent or patent application publication with color drawing(s) will be provided by the Office upon request and payment of the necessary fee.

WRITTEN DESCRIPTION

Figure 1:
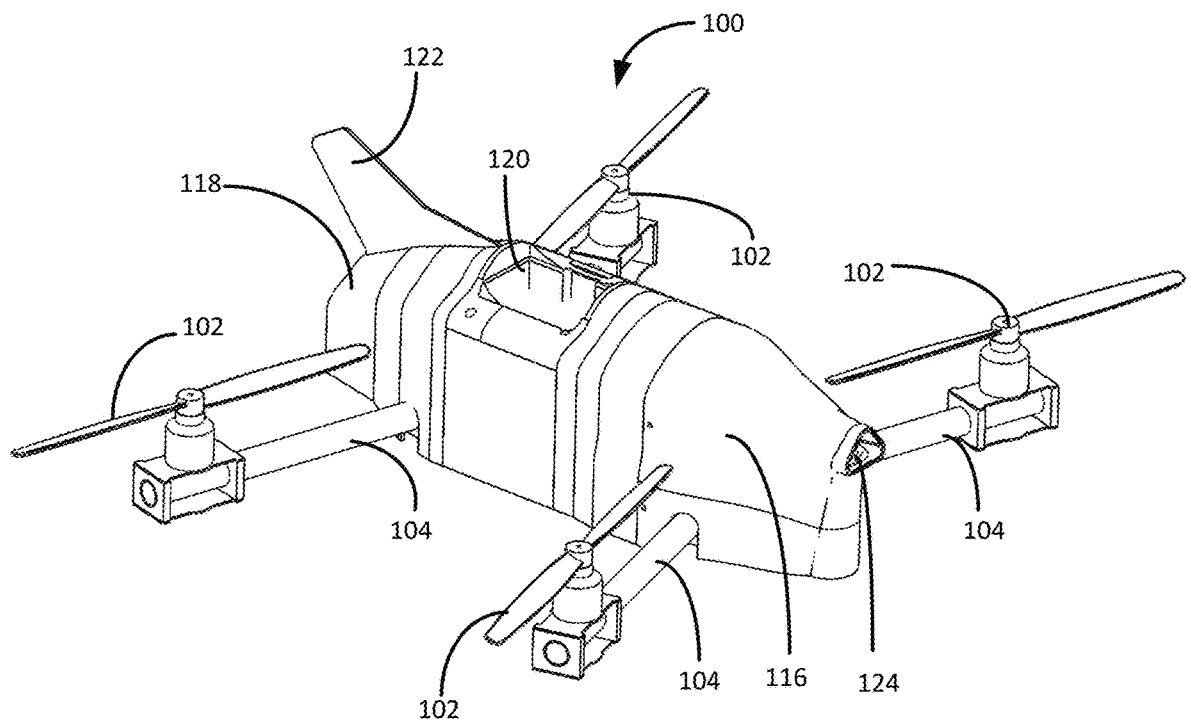
FIG. 1 is front perspective view of an unmanned aerial system for use in the presently disclosed system.

In one aspect, the present disclosure is directed to an unmanned aerial system configured to measure one or more atmospheric conditions. The unmanned aerial system has a frame, a plurality of arms extending outward from the frame, and a plurality of motorized rotors, where each of the plurality of motorized rotors is supported by a separate one of the plurality of arms. The unmanned aerial system further includes a flight control module that includes a computer programmable flight control board. The unmanned aerial system further includes a sensor package that has an air sampling scoop, a first sensor positioned inside the air sampling scoop, and a ducted fan inside the air sampling scoop. The ducted fan is configured to draw air through the air sampling scoop in contact with the first sensor.

In another aspect, the present disclosure is directed to an unmanned aerial system that is configured to measure one or more atmospheric conditions. The unmanned aerial system has a frame, a plurality of arms extending outward from the frame, a plurality of motorized rotors, wherein each of the plurality of motorized rotors is supported by a separate one of the plurality of arms, and a flight control module supported by the frame. The flight control module includes a flight control board programmed to provide a mode of operation in which wind speed is determined by evaluating the pitch of the unmanned aerial system while it faces the wind in a horizontally stationary position.

In yet another aspect, the present disclosure includes, in certain embodiments, a sensor package for use in an unmanned aerial system configured to measure one or more atmospheric conditions. The sensor package includes an air sampling scoop which has an intake, a discharge, and a central portion between the intake and the discharge. The air sampling scoop has one or more internal vanes proximate the central portion. The air sampling scoop also includes a ducted fan inside the discharge to draw air through the air sampling scoop. The ducted fan is configured to operate only when the unmanned aerial system is above a predetermined altitude. The sensor package further includes a plurality of sensors positioned inside the air sampling scoop between the intake and the ducted fan.

Before further describing various embodiments of the present disclosure in more detail by way of exemplary description, examples, and results, it is to be understood that the embodiments of the present disclosure are not limited in structure and application to the details as set forth in the following description. The embodiments of the present disclosure are capable of being practiced or carried out in various ways not explicitly described herein. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description. While the present disclosure has been described in terms of particular embodiments, it will be apparent to those of skill in the art that variations may be applied to the apparatus and/or methods and in the steps or in the sequence of steps of the methods described herein without departing from the concept, spirit, and scope of the inventive concepts as described herein. All such similar substitutes and modifications apparent to those having ordinary skill in the art are deemed to be within the spirit and scope of the inventive concepts as disclosed herein.

All patents, published patent applications, and non-patent publications referenced or mentioned in any portion of the present specification are indicative of the level of skill of those skilled in the art to which the present disclosure pertains, and are hereby expressly incorporated by reference in their entirety to the same extent as if the contents of each individual patent or publication was specifically and individually incorporated herein.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

As utilized in accordance with the apparatus, methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the terms "at least one" or "plurality" will be understood to include one as well as any quantity more than one, including but not limited to, 2, 3, 4, 5, 6, 7, 8, 9, 10, 15, 20, 30, 40, 50, 100, or any integer inclusive therein, and/or any range described herein. The terms "at least one" or "plurality" may extend up to 100 or 1000 or more, depending on the term to which it is attached; in addition, the quantities of 100/1000 are not to be considered limiting, as higher limits may also produce satisfactory results. In addition, the use of the term "at least one of x, y and z" will be understood to include x alone, y alone, and z alone, as well as any combination of x, y and z.

Where the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "a, b, c, or combinations thereof" is intended to include at least one of: a, b, c, ab, ac, bc, or abc, and if order is important in a particular context, also ba, ca, cb, cba, bca, acb, bac, or cab. Continuing with this example, expressly included are combinations that contain repeats of one or more item or term, such as bb, aaa, aab, bbc, aaabcccc, cbbaaa, cababb, and so forth. The skilled artisan will understand that typically there is no limit on the number of items or terms in any combination, unless otherwise apparent from the context.

Throughout this application, the terms "about" and "approximately" are used to indicate that a value includes the inherent variation of error for the composition, the method used to administer the composition, or the variation that exists among the objects, or study subjects. As used herein the qualifiers "about" or "approximately" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The terms "about" or "approximately", where used herein when referring to a measurable value such as an amount, a temporal duration, thickness, width, length, and the like, is meant to encompass, for example, variations of +20% or +10%, or +5%, or +1%, or =0.1% from the specified value, as such variations are appropriate to perform the disclosed methods and as understood by persons having ordinary skill in the art. As used herein, the term "substantially" means that the subsequently described event or circumstance completely occurs or that the subsequently described event or circumstance occurs to a great extent or degree. For example, the term "substantially" means that the subsequently described event or circumstance occurs at least 75% of the time, at least 80% of the time, at least 90% of the time, at least 95% of the time, or at least 98% of the time.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-30 therefore includes 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30, as well as sub-ranges within the greater range, e.g., for 1-30, sub-ranges include but are not limited to 1-10, 2-15, 2-25, 3-30, 10-20, and 20-30. Reference to a range of 1-50 therefore includes 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30, etc., up to and including 50. Reference to a series of ranges includes ranges which combine the values of the boundaries of different ranges within the series. Thus, to illustrate reference to a series of ranges, for example, a range of 1-1,000 includes, but is not limited to, 1-10, 2-15, 2-25, 3-30, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 1 mm to 10 m therefore refers to and includes all values or ranges of values, and fractions of the values and integers within said range, including for example, but not limited to, 5 mm to 9 m, 10 mm to 5 m, 10 mm to 7.5 m, 7.5 mm to 8 m, 20 mm to 6 m, 15 mm to 1 m, 31 mm to 800 cm, 50 mm to 500 mm, 4 mm to 2.8 m, and 10 cm to 150 cm. Any two values within the range of 1 mm to 10 m therefore can be used to set lower and upper boundaries of a range in accordance with the embodiments of the present disclosure.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The inventive concepts of the present disclosure will be more readily understood by reference to the following examples and embodiments, which are included merely for purposes of illustration of certain aspects and embodiments thereof, and are not intended to be limitations of the disclosure in any way whatsoever. Those skilled in the art will promptly recognize appropriate variations of the apparatus, compositions, components, procedures and method shown below.

Figure 2:
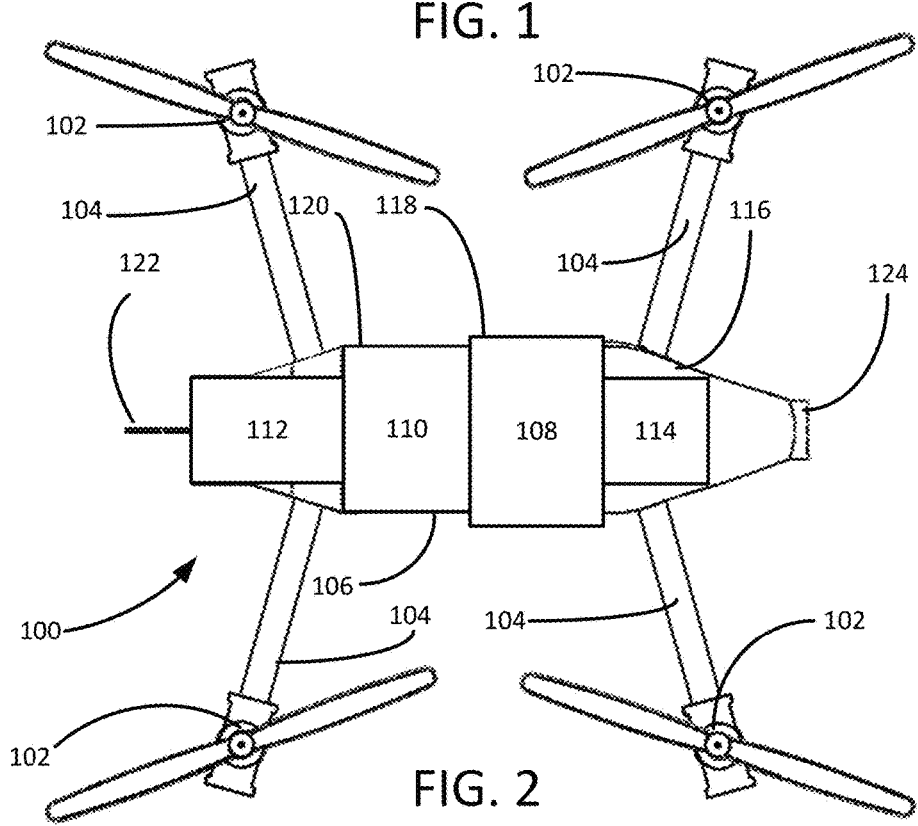
FIG. 2 is a top view of the unmanned aerial system of FIG. 1 illustrating the placement of various components within the unmanned aerial system.

In exemplary embodiments, the present disclosure includes an unmanned aerial system 100 configured to provide enhanced measurements within the atmospheric. Turning first to FIGS. 1 and 2, shown therein are perspective and annotated side views, respectively, of an unmanned aerial system 100 constructed in accordance with an exemplary, illustrative embodiment. The unmanned aerial system 100 is generally configured as a rotary wing drone, which a plurality of motorized rotors 102 suspended on arms 104 that extend away from a frame 106. The frame 106 supports the various onboard components that together form functional modules within the unmanned aerial system 100. As illustrated in FIG. 2, the unmanned aerial system 100 includes a flight control module 108, a battery 110, a communications module 112 and a sensor package 114. Many of the components within the unmanned aerial system 100 can be procured from commercially available sources. For example, the Lynxmotion HQuad500 construction frame kit available from RobotShop Distribution, Inc. includes many of the generic components upon which the unmanned aerial system 100 can be constructed. In some embodiments, the battery 110 is a rechargeable lithium polymer battery.

The unmanned aerial system 100 includes an outer body that includes a front shell 116 and a rear shell 118. The rear shell 118 is configured to enclose the communications module 112, the battery 110 and the flight control module 108. The rear shell 118 may include a battery hatch 120 that permits the installation and removal of the battery 110 without removing the entire rear shell 118. The battery 110 is optimally contained within an isolated compartment within the rear shell 118 to reduce the risk of heat transfer to other components within the unmanned aerial system 100. The rear shell 118 also includes a vertical stabilizer 122 that increases the stability of the unmanned aerial system 100 during flight. The vertical stabilizer 122 also improves the sensitivity of the unmanned aerial system 100 for detecting the direction of the wind.

The sensor package 114 is integrated within the front shell 116. The integration of the sensor package 114 into the front shell 114 permits the facilitated exchange of various sensor packages 114 within a common unmanned aerial system 100. The modular nature of the sensor package 114 and frame 106 permits a single unmanned aerial system 100 to be easily reconfigured for multiple experiments and measurement tasks with different sensor packages 114. The front shell 116 includes an integrated air sampling scoop 124 that provides a protected path for air to pass through the sensor package 114. In some embodiments, the air sampling scoop 124 includes an internal ducted fan 126 (shown in FIG. 4) that draws air through the air sampling scoop 124. For purposes of this disclosure, the unmanned aerial system 100 will be described as having a central longitudinal axis that extends from the front of the unmanned aerial system 100 (near the air sampling scoop 124) to the rear of the unmanned aerial system 100 (near the vertical stabilizer 122).

Figure 3:
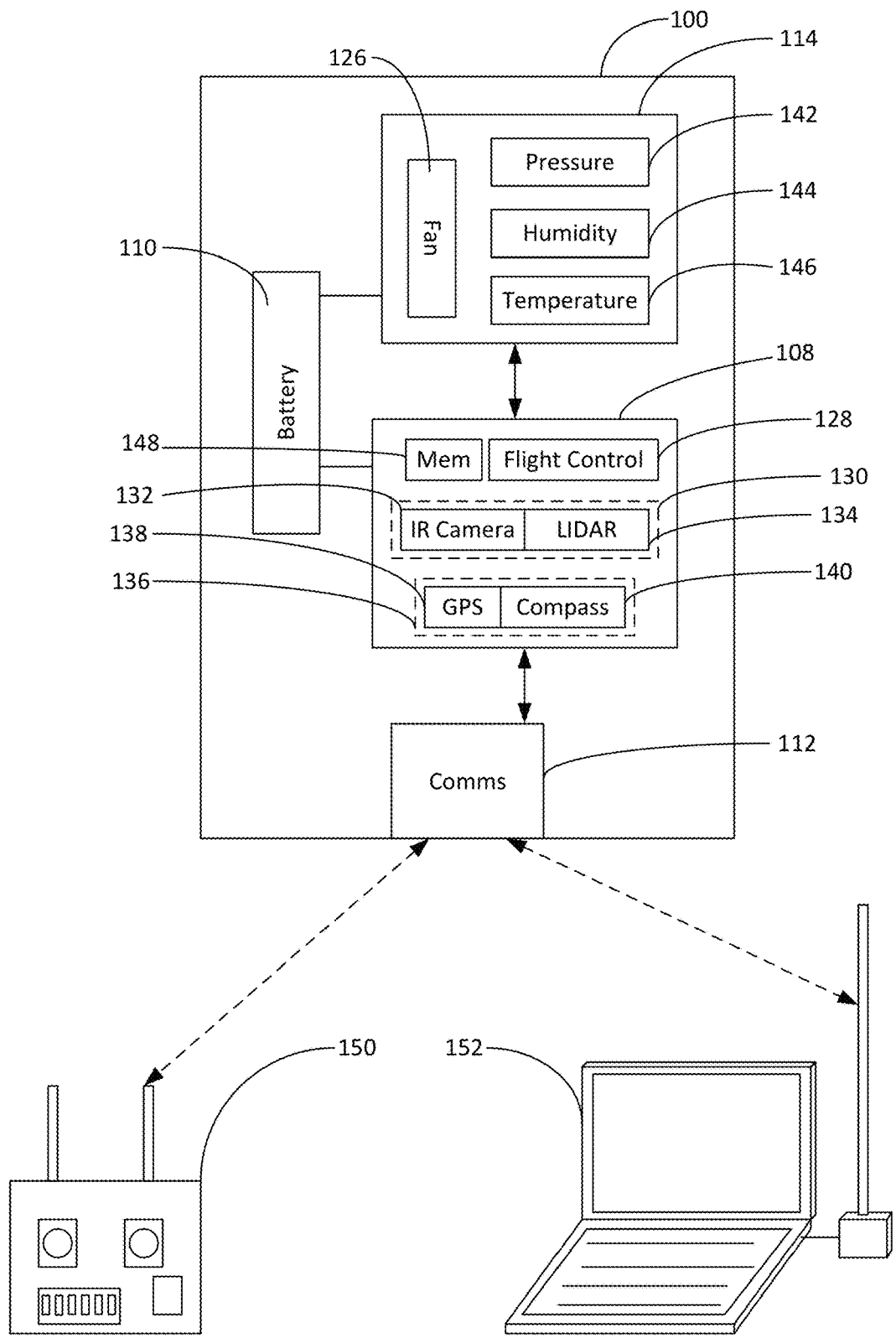
FIG. 3 is a functional block diagram illustrating the various modules and components within the unmanned aerial system of FIG. 1.

Turning to FIG. 3, shown therein is a functional block diagram illustrating the functional interrelationships between the various components within the unmanned aerial system 100. The flight control module 108 includes a flight control board 128 that controls the independent and coordinated operation of the motorized rotors 102 to adjust the movement, orientation and position of the unmanned aerial system 100 during flight. The flight control board is computer programmable and capable of executing complex autonomous flight routines. Suitable flight control boards 128 include the Pixhawk CubeBlack autopilot board available from Hex Technology. The autopilot flight control software can be loaded onto the flight control board 128 and used to control the primary flight functions of the unmanned aerial system 100. Suitable custom-programmable flight control software includes the ArduPilot software, which can be licensed under the GNU General Public License (GPLv3). In exemplary embodiments, the flight control software permits fully automated, semi-automated and user-operated (manual) flight modes.

The flight control module 108 also includes a landing system 130 that is designed to facilitate launching and landing the unmanned aerial system 100. The landing system 130 may include an IR camera 132 and a laser-based (e.g., LIDAR) rangefinder 134 that together ensure safe landings by accurately measuring the distance between the unmanned aerial system 100 and a given landing surface and slowing the descent of the unmanned aerial system 100 as it approaches the landing surface. The flight control module 108 further includes an avionics system 136 configured to determine the location and orientation of the unmanned aerial system during flight. In exemplary embodiments, the avionics system 136 includes a global positioning system (GPS) unit 138 and an electronic compass 140. The avionics system 136 may further include accelerometers, inertial measurement units (IMUs) and other sensors to determine the pitch, roll and yaw of the unmanned aerial system 100.

The sensor package 114 includes one or more sensors configured to measure one or more characteristics of the atmosphere. Although the present disclosure is not so limited, the sensor package 114 can include a pressure sensor 142, a humidity sensor 144 and a temperature sensor 146. In some embodiments, the sensor package 114 includes three temperature sensors 146, three humidity sensors 144 and a single pressure sensor 142. The temperature sensors 146 may include bead thermistors available from International Met Systems (iMet). The humidity sensors 144 may include HYT-271 humidity sensors distributed by Innovative Sensor Technology (IST).

The ducted fan 126 can be controlled by the sensor package 114. In some embodiments, the sensor package 114 is connected directly to the flight control module 108, which in turn is connected to the communication module 112. Communication between the sensors within the sensor package 114 and the autopilot flight control module 108 can be carried over a single bus using the I2C protocol, which permits sampling and storing up to 8 sensors at 20 Hz each to an internal memory card 148 located on the flight control board 128. The communications module 112 may include one or more antennae that are adapted to permit communication between the unmanned aerial system 100 and a wireless controller 150, a radio-equipped computer 152, or other wireless receiver.

Figure 4:
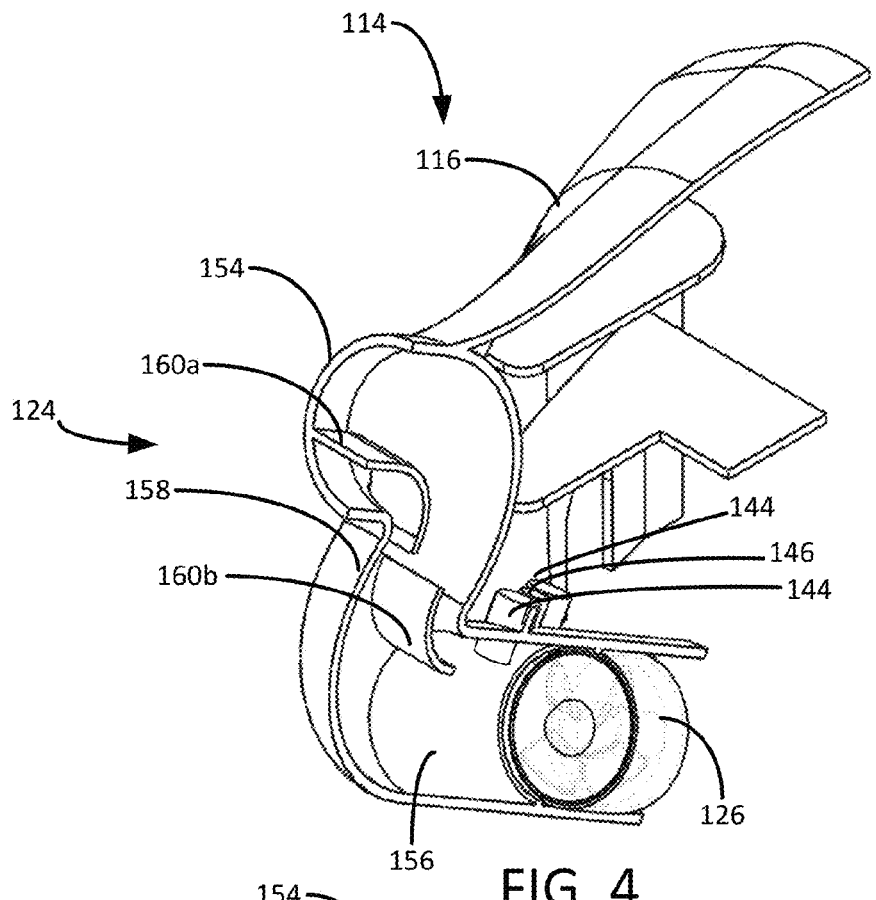
FIG. 4 is an isometric section-cut view of the front shell of the unmanned aerial system with an S-shaped air sampling scoop.

Turning to FIG. 4, shown therein is a close-up perspective, cross-sectional view of the front shell 116 and sensor package 114. In this embodiment, the air sampling scoop 124 is "S-shaped" and angularly disposed with reference to the main longitudinal axis of the unmanned aerial system 100 such that an intake 154 faces upward and forward, an exhaust 156 proximate the ducted fan 126 discharges air in a downward and rearward direction, and a central portion 158 with two bends connects the intake 154 to the exhaust 156. The "S-shaped" air sampling scoop 124 prevents direct solar radiation from impacting the sensors 144, 146. The air sampling scoop 124 may include one or more internal vanes 160 configured to control the turbulence of air moving through the air sampling scoop 124 to prevent pockets of static flow from developing within the air sampling scoop 124. In the embodiment depicted in FIGS. 4 and 5, the air sampling scoop 124 includes a forward vane 160a at the intake 154 and a central vane 160b at the interior bend within the central curved portion 158.

Figure 5:
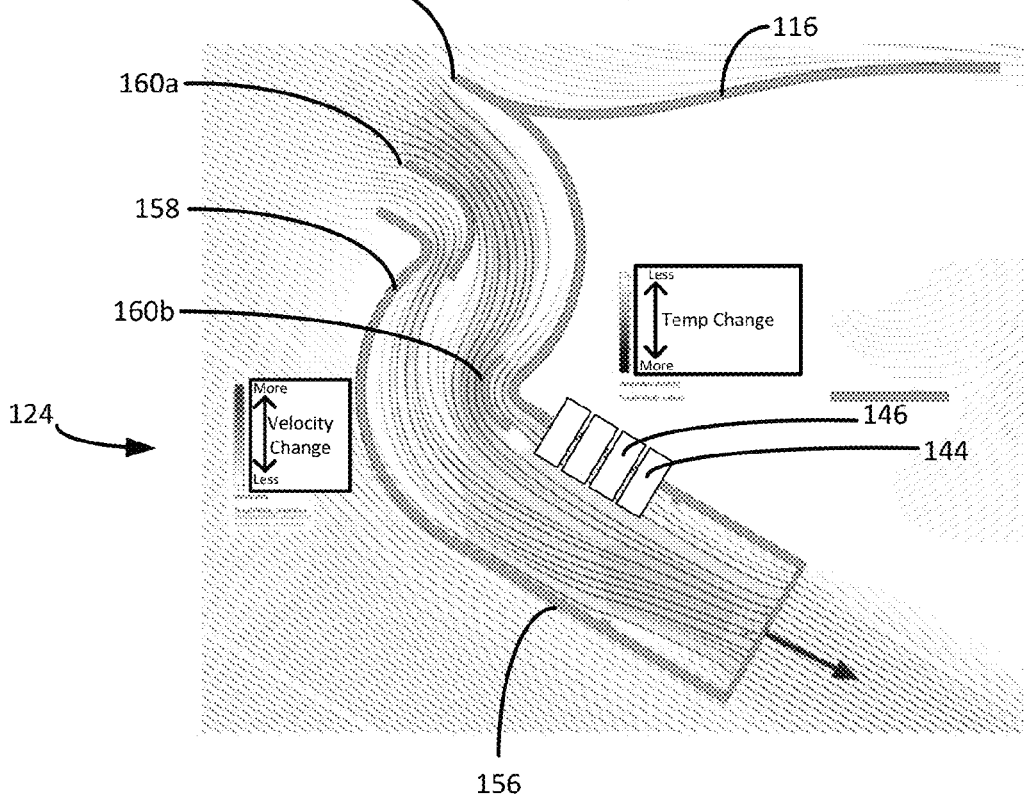
FIG. 5 shows a simulation of air flow inside the S-shape air sampling scoop of FIG. 4 (temperature changes are shown in tones of blue and airflow velocity is shown in tones of red with streamlines).

The sensors (e.g., the humidity sensors 144 and temperature sensors 146) are optimally positioned in the exhaust 156 upstream of the ducted fan 126. In this position within the air sampling scoop 124, the humidity and temperature sensors 144 and 146 are isolated from external turbulence (e.g., prop wash), solar radiation, and localized heat patterns caused by the motorized rotors 102 and battery 110 of the unmanned aerial system 100. As best illustrated in FIG. 5, the vanes 160 and curved profile of the air sampling scoop 124 further reduce internal turbulence to improve the accuracy of the measurements taken by the sensor package 114. In some embodiments, the sensors are arranged in inverted "V-shaped" arrays to minimize measurement contamination caused by upstream sensors (i.e., from self-heating sensors). The sensors 144 and 146 and ducted fan 126 have been removed from the air sampling scoop 124 in FIG. 5 to better illustrate the flow characteristics through the air sampling scoop 124. Although a pressure sensor 142 is integrated into the flight control board 128 to assist with control of the unmanned aerial system 100 during flight, an independent pressure sensor 142 can also be placed within the air sampling scoop 124 for further characterization of the atmospheric sampling conditions.

Figure 6A:
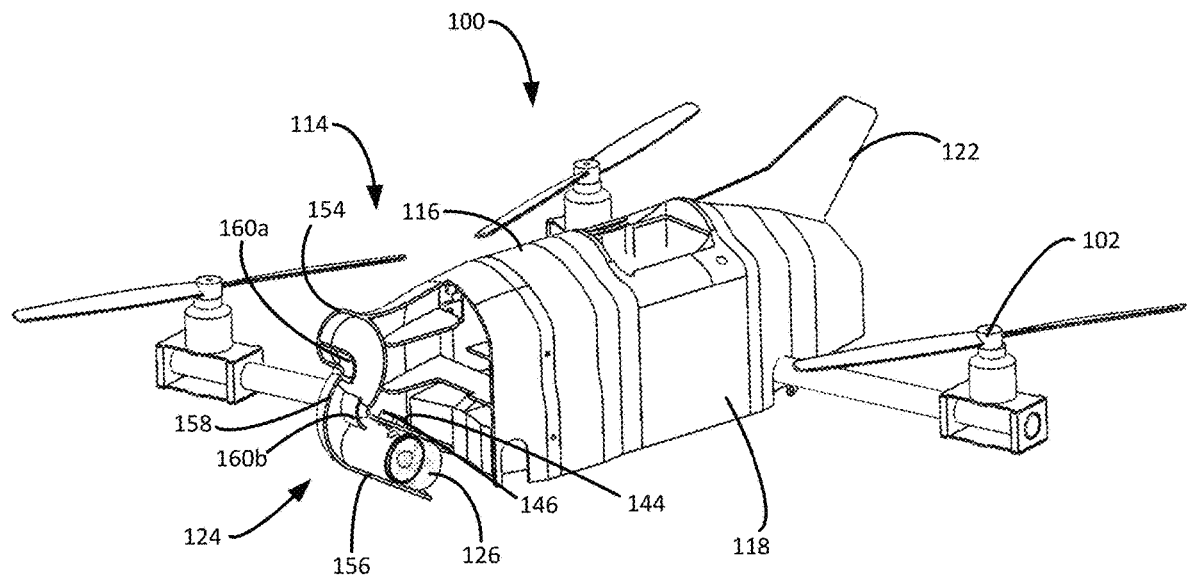
FIG. 6A is a partial cross-sectional view of an embodiment of the unmanned aerial system that includes an S-shaped air sampling scoop.
Figure 6B:
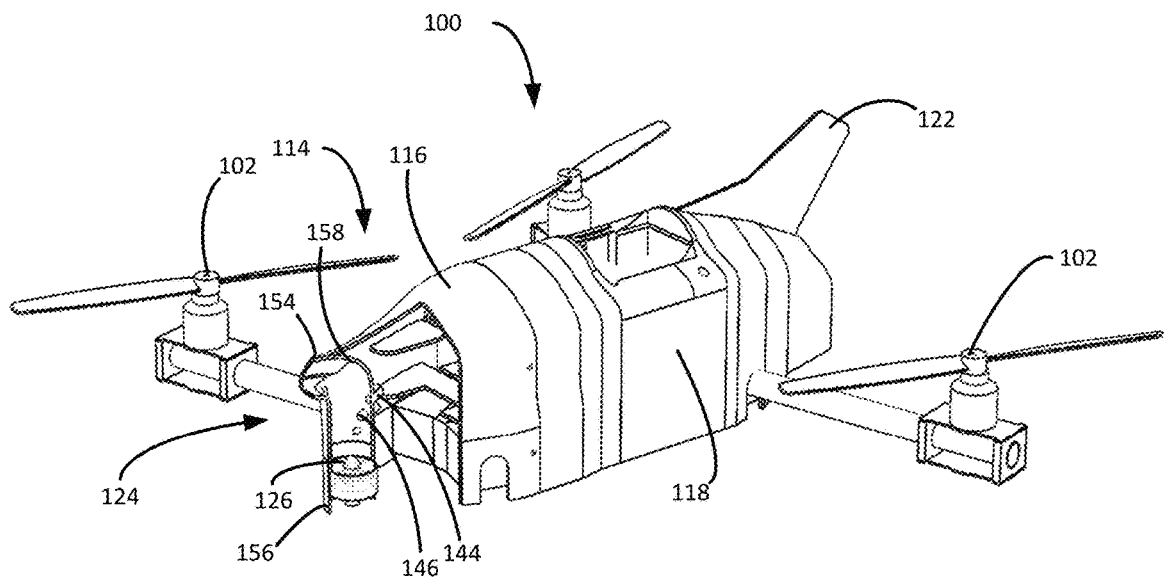
FIG. 6B is a partial cross-sectional view of an embodiment of the unmanned aerial system that includes an L-shaped air sampling scoop.

Turning to FIG. 6A, shown therein is partial cross-sectional view of the unmanned aerial system 100 that includes the "S-shaped" air sampling scoop depicted in FIG. 4. An alternate embodiment is depicted in FIG. 6B, in which the air sampling scoop 124 is "L-shaped" such that the intake 154 faces forward and slightly upward and the exhaust 156 faces substantially downward. The central portion 158 includes a single bend. The sensors 144 and 146 are positioned in the substantially vertical exhaust 156 between the central portion 158 and the ducted fan 126. In both embodiments, the placement of the thermodynamic sensors inside the air sampling scoop 124 provides radiation shielding from the sun and isolates the sensors from variable wind conditions.

In exemplary embodiments, the ducted fan 126 is configured to automatically turn off, or remain off, when the unmanned aerial system 100 is near the ground or other landing surface. Dust and other solid particles that are common at lower altitudes near the launch and landing surface may harm the sensor package 114. Disabling the ducted fan 126 when the unmanned aerial system 100 is near contaminants reduces the risk of damage and erroneous measurements within the sensor package 114, and prolongs the life of the sensors 144, 146. The ducted fan 126 can also be controlled in response to an in-flight command signal from the operator or as part of pre-programmed flight instructions.

The arrangement of the various electronic components within the unmanned aerial system 100 increases its modularity and facilitates performing routine maintenance. In particular, the payload (sensor package 114) is strategically placed at the front-most section of the unmanned aerial system 100. Consequently, the sensors 144 and 146 are subjected to a cleaner airflow by keeping the payload facing into the wind. As a result, undesired data contamination (produced by sources such as the heat emanated by the unmanned aerial system 100 itself) is significantly reduced.

Unlike prior art weather measurement drones, the unmanned aerial system 100 is uniquely configured to measure wind speed and direction using the orientation and thrust produced by the unmanned aerial system 100 in a "wind vane" mode of operation. The approach used to estimate the 2D wind vector on the unmanned aerial system 100 is based on the longitudinal tilt (pitch) measurements given by its onboard inertial measurement unit (IMU). By keeping the magnitude of the roll angle of the unmanned aerial system 100 around zero, a quasi-symmetric condition to the oncoming wind can be achieved, and thus the wind speed can be calculated based on the pitch angle and a function of projected area normal to the wind. The concept of the wind vane mode is based on the control of the unmanned aerial system 100 in a manner in which the front of the unmanned aerial system 100 is pointed continuously into headwind by changing its yaw angle in the direction that the roll is minimized. The ability to measure wind speed and direction with the orientation of the unmanned aerial system 100 eliminates the need for dedicated airspeed sensors or anemometers, which allows the unmanned aerial system 100 to carry additional sensors for observing other atmospheric conditions.

Figure 7:
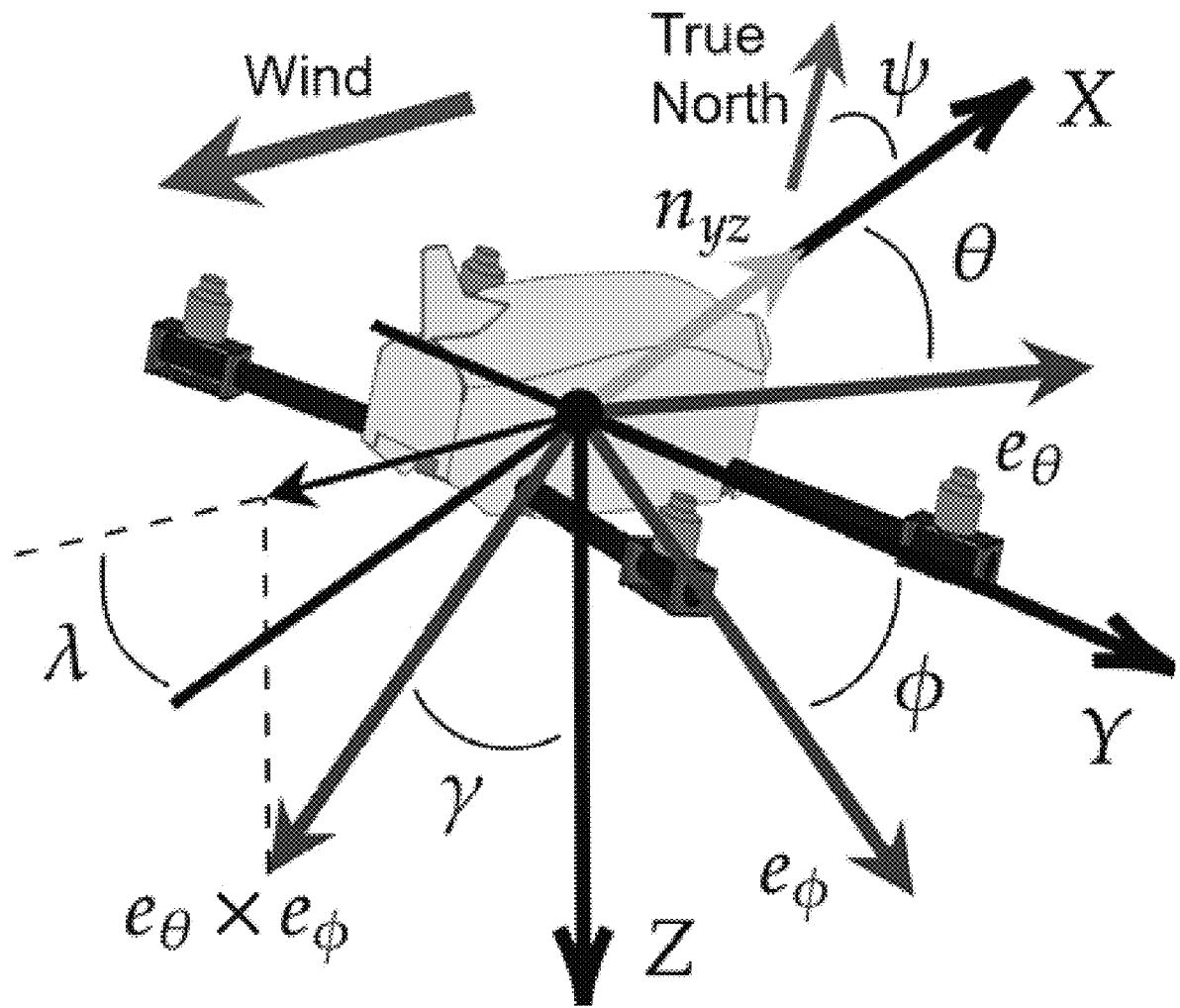
FIG. 7 is a depiction of the unmanned aerial system of FIG. 1 in the process of orientating into a "wind vane" mode of operation.

The reference frame convention used for vector calculations is depicted in FIG. 7, where $n_{yz}$ is a unit vector in the direction of X normal to the plane YZ of the inertial frame I:{X, Y, Z}, $\theta$ and $\varphi$ are pitch and roll angles, respectively, and $e_\theta$ and $e_\varphi$ are unit vectors of the body reference frame. The angle between the vector $v=(e\theta \times e_\varphi)_{xy}$, normal to the horizontal plane of the unmanned aerial system 100, and the axis Z is a measure of the tilt of the unmanned aerial system 100 and it is denoted by $\gamma$. The magnitude and direction of the projection of v onto the plane XY of I can be directly associated with the wind speed and direction, respectively.

Subsequently, the wind direction with respect to true heading (X axis) of the unmanned aerial system 100 is:

$$\lambda = \arccos\left(\frac{n_{yz} \cdot (e_\theta \times e_\phi)_{xy}}{|n_{yz}| \cdot |(e_\theta \times e_\phi)_{xy}|}\right) \quad \text{(Eq. 1)}$$

and after some vector operations and math simplifications, $\lambda$ results in $$\lambda = \arctan\left(\frac{-\cos\theta\sin\phi}{\sin\theta\cos\phi}\right) \quad \text{(Eq. 2)}$$

where $$e_\theta = \begin{bmatrix} \cos\theta \\ 0 \\ -\sin\theta \end{bmatrix} \text{ and } e_\phi = \begin{bmatrix} 0 \\ \cos\phi \\ \sin\phi \end{bmatrix}.$$

Additionally, the unmanned aerial system 100 is constantly measuring its heading with respect to the true north by means of an onboard compass which is denoted by $\psi$. The sum of $\psi$ with the computed angle $\lambda$ gives the absolute wind direction. However, since the algorithm commands the unmanned aerial system 100 to turn into the wind, then the angle $\lambda$ tends to zero and, consequently, $\psi$ tends to the absolute wind direction. It should be noted that the wind vane algorithm works only when the unmanned aerial system 100 is horizontally steady, and the tilt angle $\gamma$ is produced only as a result of the unmanned aerial system 100 compensating for wind.

The autopilot flight control board 128 executes the wind vane code and calculates the wind direction $\lambda$ at a selected frequency rate. Despite the fast computation of $\lambda$, it is better to filter a sequence of a plurality of $\lambda$ readings over a period of time and remove any undesired perturbations. A digital Butterworth filter with a reduced delay modification was implemented to smooth out the wind estimates and provide a continuous yaw command to the flight control. For the particular unmanned aerial system 100 described herein, a filter cut-off frequency of 0.05 Hz and sampling rate of about 10 Hz was found to provide the best results.

A more accurate wind vector calculation can be achieved in post-processing. This can be done by considering a more complex model and exploiting the high temporal resolution data stored in the memory 148 of the unmanned aerial system 100. This model is based on the unmanned aerial system 100 maintaining its horizontal position by tilting into any oncoming wind to divert its vertical thrust vector, which can then be characterized as a function of wind speed. Based on the local coordinate system of the aircraft, the inclination angle (or vertical tilt) $\gamma$ is calculated as:

$$\gamma = \arccos(\cos\theta \cos\varphi) \quad \text{(Eq. 3)}$$

where $\theta$ and $\varphi$ are again the pitch and roll angles, respectively. The inclination angle is directly proportional to the drag force $F_d$ by the wind on the aircraft as $\tan\gamma$, and $F_d$ in turn is related to the wind speed (v) encountered by the unmanned aerial system 100 as:

$$v = \sqrt{\frac{2F_d}{\rho A_{proj} c_d'}} \quad \text{(Eq. 4)}$$

where $\rho$ is the air density, $A_{proj}$ is the aircraft surface area normal to the wind, and $c_d$ is a drag coefficient. Because of continually changing conditions and orientations of the unmanned aerial system 100, $A_{proj}$ and $c_d$ are generally not well-defined. However, it is possible to estimate wind speed through a linear regression model as:

$$v = C_0 + C_1 \sqrt{\tan\gamma} \quad \text{(Eq. 5)}$$

where constants $C_0$ and $C_1$ are derived empirically using a common reference measuring wind speed. This model therefore accounts for the intricate design geometry of the unmanned aerial system 100 to a first order approximation without the need for complicated expressions for drag coefficients and surface areas. Environmental wind direction can also be estimated based on the direction of the tilt of the unmanned aerial system 100. By also incorporating the aircraft heading relative to true North (yaw angle, $\psi$), the wind direction can be evaluated though the same procedure set forth above (Eq. 2).

The procedure for determining coefficients C0 and C1 in Eq. 5 and evaluating the performance of these models for the unmanned aerial system 100 is carried out by flying the unmanned aerial system 100 near a reference weather measurement tower that provides wind speed and direction. The unmanned aerial system 100 is flown at a hover at a specified height near the tower for a specified time (e.g., 10-15 minutes) at a time on several days under a variety of wind conditions for the statistical model. The aircraft inclination angles are then averaged to 1 minute intervals to be consistent with the reference wind data. Linear regression is then performed with the input of $\sqrt{\tan\gamma}$ and reference wind speed to get a transfer function of the form in Eq. 5. This can then be applied to output unmanned aerial system 100 wind speed estimates. In practice compared to other sampling methodologies like radiosondes and Doppler wind lidars, this method of estimating wind speed with the unmanned aerial system 100 has been shown to be accurate to +0.6 m s−1.

Similarly, the wind direction estimated by the unmanned aerial system 100 during these calibration flights is compared to the reference tower data. Generally, this is a more direct approach and does not require any statistical modeling, unless a constant offset bias is observed. The output angle for the unmanned aerial system 100 as calculated from Eq. 2 and accounting for the yaw angle ψ tends to be within about 4 degrees of the reference in recent calibrations, which can then be left uncorrected.

Figure 8:
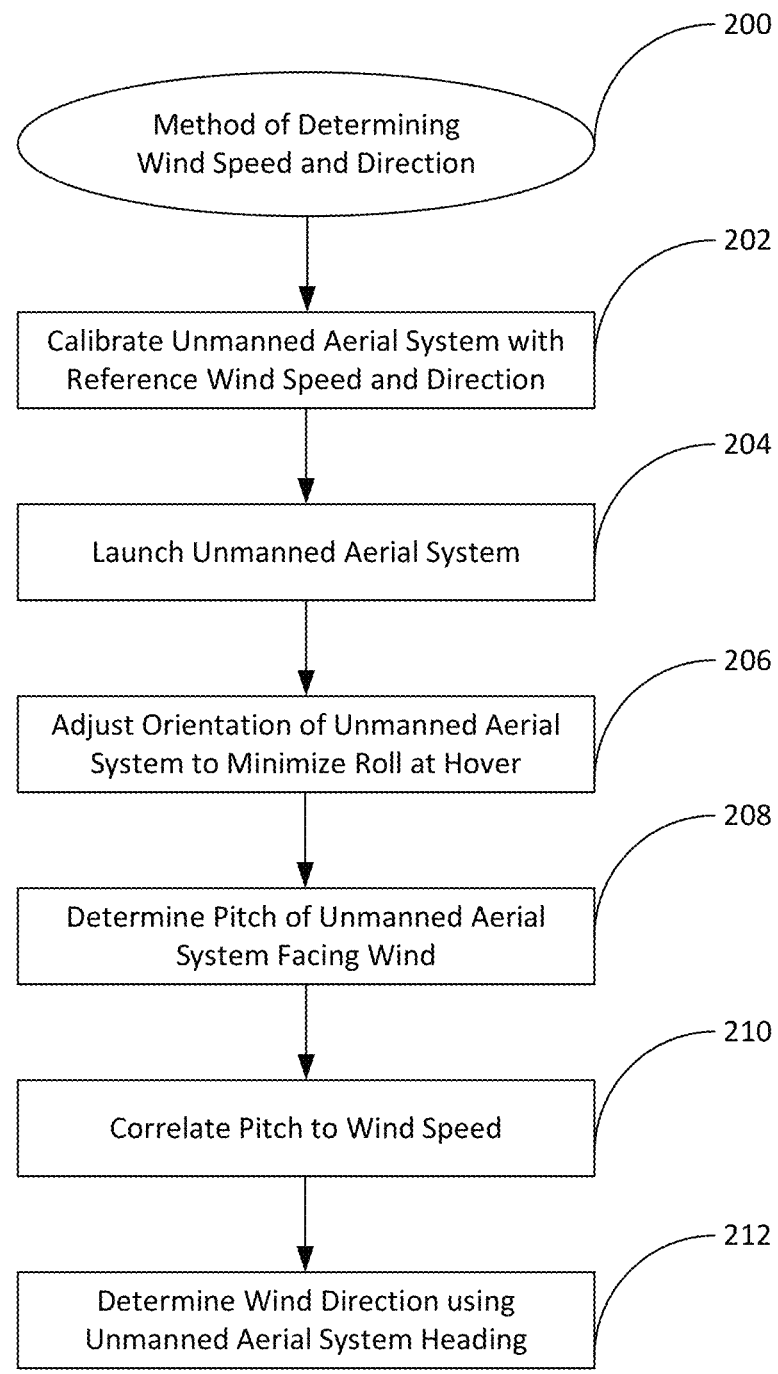
FIG. 8 is a process flow diagram illustrating the implementation of the wind vane mode of operation.

Turning to FIG. 8, shown therein is a simplified expression of the method 200 of determining wind speed and direction by placing the unmanned aerial system 100 in the "wind vane" mode of operation. The method begins at step 202, where the unmanned aerial system is calibrated by flying the unmanned aerial system 100 near a reference weather monitoring tower that measures and reports wind vectors at the altitude of the unmanned aerial system 100. Calibrating the unmanned aerial system 100 involves determining the proper coefficients for calculating wind speed based on the pitch angle of the unmanned aerial system 100 while it hovers in a stationary position facing into the wind. It will be appreciated that the calibration step 202 may only be required on a one-time or periodic basis. Once the unmanned aerial system 100 has been sufficiently calibrated, the method proceeds to step 204 and the unmanned aerial system 100 is launched in a live monitoring operation. At step 206, the unmanned aerial system 100 is adjusted to minimize (or zero) the roll of the unmanned aerial system 100 while hovering in a stationary horizontal position. In this condition, the unmanned aerial system 100 is facing into the wind and remains stationary based on the non-vertical component of thrust expressed by the pitch of the unmanned aerial system 100. Next, at step 208, the pitch of the unmanned aerial system 100 is determined using onboard accelerometers or inertial measurement units (IMUs). Once the pitch angle has been determined, the process moves to step 210 where the pitch angle is mathematically correlated to wind speed, based in part on the coefficients established during the calibration step 202. At step 212, the direction of the wind is determined using the heading of the unmanned aerial system 100. The heading can be determined, for example, by taking readings from the compass 140. It will be appreciated that steps 208-210 and 212 can be performed at the same time, or in reverse order.

Additional information regarding the construction, calibration, and use of the unmanned aerial system 100 is presented in "*The Copter Sonde: An Insight into the Development of a Smart UAS for Atmospheric Boundary Layer Research*" (Segales et al., Atmospheric Measurement Techniques, Volume 13, Issue 5, 2020, pp. 2833-2848, May 2020), the disclosure of which is herein incorporated by reference.

The unmanned aerial system 100 is well suited to address the challenge of filling the observational gap present in the lower atmosphere among the currently used meteorological instruments such as towers and radiosondes. In particular, the unmanned aerial system 100 is capable of accurately measuring a variety of atmospheric conditions (e.g., temperature, pressure and humidity) with dedicated atmospheric sensors 144, 146 within a modular and exchangeable sensor package 114. The unmanned aerial system 100 includes an isolated air sampling scoop 124 with an intelligent ducted fan 126 that improves the accuracy of measurements taken by the sensor package 114. In addition to the measurements made by the sensor package 114, wind speed and direction can be accurately determined based on the pitch of the unmanned aerial system 100 when the unmanned aerial system 100 is pointed into the direction of the wind through the "wind vane" mode of operation. The seamless integration and combination of the various features of the disclosed UAS makes it an efficient apparatus for fast and accurate atmospheric sampling.

Thus, the embodiments of the present disclosure are well adapted to carry out the objects and attain the ends and advantages mentioned above as well as those inherent therein. While the inventive system and method have been described and illustrated herein by reference to particular non-limiting embodiments in relation to the drawings attached thereto, various changes and further modifications, apart from those shown or suggested herein, may be made therein by those of ordinary skill in the art, without departing from the spirit of the inventive concepts

What is claimed is:

1. An unmanned aerial system configured to measure one or more atmospheric conditions, the unmanned aerial system comprising:
    a frame;
    a plurality of arms extending outward from the frame;
    a plurality of motorized rotors, wherein each of the plurality of motorized rotors is supported by a separate one of the plurality of arms;
    a flight control module supported by the frame, wherein the flight control module comprises a flight control board;
    an outer body that includes a front shell and a rear shell secured to the frame; and
    a sensor package, wherein the sensor package comprises:
        an air sampling scoop integrated into the front shell, wherein the air sampling scoop comprises:
            an intake that faces forward; and
            an exhaust adjacent to the ducted fan that faces downward;
        a first sensor positioned inside the air sampling scoop; and
        a ducted fan inside the air sampling scoop, wherein the ducted fan is configured to draw air through the air sampling scoop in contact with the first sensor.

2. The unmanned aerial system of claim 1, wherein the sensor package comprises a plurality of sensors, wherein each of the plurality of sensor is positioned inside the air sampling scoop proximate to the ducted fan.

3. The unmanned aerial system of claim 2, wherein the plurality of sensors comprises a temperature sensor, a humidity sensor and a pressure sensor.

4. The unmanned aerial system of claim 1, wherein the air sampling scoop is S-shaped.

5. The unmanned aerial system of claim 1, wherein the air-sampling scoop is L-shaped.

6. The unmanned aerial system of claim 1, wherein the ducted fan is configured to automatically turn off when the unmanned aerial system is operating below a predetermined altitude.

7. The unmanned aerial system of claim 1, wherein the flight control board comprises a customized automated flight program with integrated atmospheric monitoring functions.

8. The unmanned aerial system of claim 7, wherein the automated flight program includes a mode of operation in which wind speed is determined by evaluating the pitch of the thrust of the unmanned aerial system while it faces the wind in a horizontally stationary position.

9. The unmanned aerial system of claim 7, wherein the automated flight program includes a mode of operation in which the wind direction is determined by evaluating the heading of the unmanned aerial system while the unmanned aerial system faces the wind in a horizontally stationary position.

10. An unmanned aerial system configured to measure one or more atmospheric conditions, the unmanned aerial system comprising:
- a frame;
- a plurality of arms extending outward from the frame;
- a plurality of motorized rotors, wherein each of the plurality of motorized rotors is supported by a separate one of the plurality of arms;
- a detachable front shell;
- a detachable rear shell;
- a flight control module supported by the frame, wherein the flight control module comprises a flight control board;
- a sensor package, wherein the sensor package comprises:
    - an air sampling scoop;
    - a first sensor positioned inside the air sampling scoop; and
    - a ducted fan inside the air sampling scoop, wherein the ducted fan is configured to draw air through the air sampling scoop in contact with the first sensor; and
- wherein the sensor package is integrated within the detachable front shell, and the flight control module is enclosed within the detachable rear shell.

* * * * *